United States Patent [19]

Ebi

[11] Patent Number: 5,747,699

[45] Date of Patent: May 5, 1998

[54] METHOD OF MEASURING TORSIONAL STRESSES AND/OR AXIAL STRESSES ON A ROTATING SHAFT OR ON A COMPARABLE WORKPIECE

[76] Inventor: Günter Ebi, Hansengelstrasse 20, D-79801 Hohentengen, Germany

[21] Appl. No.: 776,895

[22] PCT Filed: Jul. 12, 1995

[86] PCT No.: PCT/DE95/00934

§ 371 Date: Jan. 21, 1997

§ 102(e) Date: Jan. 21, 1997

[87] PCT Pub. No.: WO96/02815

PCT Pub. Date: Feb. 1, 1996

[30] Foreign Application Priority Data

Jul. 20, 1994 [DE] Germany .................. 44 25 503.9

[51] Int. Cl.$^6$ ............................................. G01L 3/00
[52] U.S. Cl. .............. 73/800; 73/862.041; 73/862.324; 73/862.624; 73/862.49; 356/35.5
[58] Field of Search ................... 73/800, 862.041, 73/862.324, 862.49, 862.624; 356/32, 35.5

[56] References Cited

U.S. PATENT DOCUMENTS

| | | | |
|---|---|---|---|
| 4,432,239 | 2/1984 | Bykov | 356/35.5 |
| 5,001,937 | 3/1991 | Bechtel et al. | 73/862.326 |
| 5,438,882 | 8/1995 | Karim-Panahi et al. | 73/862.324 |

FOREIGN PATENT DOCUMENTS

| | | |
|---|---|---|
| 0578422 | 1/1994 | European Pat. Off. . |
| 3011700 | 3/1980 | Germany . |
| 2093992 | 9/1982 | United Kingdom . |
| 2125958 | 3/1984 | United Kingdom . |

*Primary Examiner*—Robert Raevis
*Attorney, Agent, or Firm*—Robert W. Becker & Associates

[57] ABSTRACT

A method for measuring torsional stress and axial stress of a rotating workpiece includes the step of arranging at a surface of the workpiece at least two reflector pairs such that connecting lines between reflectors of each reflector pair are slanted relative to one another. The workpiece is rotated about an axis of rotation. A coherent laser light is impinged onto the at least two reflector pairs to produce reflected and interfering light beam pairs for each one of the reflector pairs. The phase difference between the light beams of each light beam pair is determined and the torsional stress and axial stress are calculated from the phase difference.

20 Claims, 3 Drawing Sheets

METHOD OF MEASURING TORSIONAL STRESSES AND/OR AXIAL STRESSES ON A ROTATING SHAFT OR ON A COMPARABLE WORKPIECE

BACKGROUND OF THE INVENTION

The invention relates to a method for measuring torsional stresses and/or axial stresses on a rotating shaft or a comparable work piece whereby subsequently the corresponding torque moments and/or bending moments are determined.

For monitoring rotating shafts (or a comparable rotating workpiece) it may be necessary to measure torsional stresses and/or axial stresses to determine therefrom the corresponding torque moments and/or bending moments in order to find out which loads are acting on the shaft. In order to be able to measure the aforementioned values, it has been necessary in the past to provide attachments on the shaft or to impose by flanging special measuring shafts. This is possible only with a great technical expenditure. Furthermore, these measuring devices are very susceptible to breakdown. Since furthermore with the known measuring technics electrical current is used, explosion prevention is not always ensured.

In EP 0 578 422 A2 a method for measuring torque of, for example, a shaft is disclosed. The measuring method suggest to arrange an optical sensor element on the workpiece to be examined. A radiation source loads the sensor element with light while a corresponding detector receives light reflected by the sensor element. As soon as torque is exerted on the workpiece, the sensor element is subjected to a corresponding deformation, and this has the consequence that the polarization of the radiation within the sensor element is changed. For determining the torque, the intensity or the changes in the spectral distribution of the radiation is measured by the detector.

In GB 2 125 958 A a further method for measuring the torque on a shaft is disclosed. For this purpose, two reflectors with axial spacing relative to one another are arranged on the shaft and they are irradiated with light. The light impulses reflected by the reflectors are received by corresponding light detectors whereby the time intervals between the respective light impulses vary with the torque acting on the shaft. Thus, depending on the measured time intervals the currently present torque can be calculated with a corresponding microprocessor and can be displayed.

In DE 30 11 700 A1 a device for measuring the load-dependent torque of a rotating shaft is disclosed. In this measuring device there are also two axially spaced reflectors arranged on the rotating shaft which are loaded with light, and, by measuring the reflected light, the torsion of the rotating shaft based on changing angular distance of the two reflectors is measured and from this the torque is calculated.

Based on this, it is an object of the invention to provide a simple method for measuring the torsional stresses and/or axial stresses on a rotating shaft or a comparable workpiece.

SUMMARY OF THE INVENTION

The inventive method for measuring torsional stress and axial stress of a rotating workpiece is primarily characterized by the steps of:

arranging at a surface of the workpiece at least two reflector pairs such that connecting lines between reflectors of each reflector pair are slanted relative to one another;

rotating the workpiece about an axis of rotation;

impinging a coherent laser light onto the at least two reflector pairs to produce reflected and interfering light beam pairs for each one of the reflector pairs;

determining a phase difference between the light beams of each light beam pair; and calculating the torsional stress and axial stress from the phase difference.

In the step of arranging four reflectors are provided such that two reflectors define one of the reflector pairs and the other two reflectors define the other reflector pair.

Alternatively, in the step of arranging three reflectors are provided for defining two reflector pairs such that one of the three reflectors is common to both reflector pairs.

The step of arranging may include providing the reflectors in the form of impressions in the workpiece, such as concave impressions or equal-sided pyramid-shaped impressions with four facets.

The step of arranging may include connecting a carrier to the workpiece and providing the reflectors in the form of impressions in the carrier, such as concave impressions or equal-sided pyramid-shaped impressions with four facets.

A first one of the connecting lines extends at an angle of +45° to the axis of rotation and a second one of the connecting lines extends at an angle of −45° to the axis of rotation.

The step of arranging includes spacing the reflectors of each one of the reflector pairs at identical distance to one another.

The step of impinging includes supplying the coherent laser light in the form of individual laser beams.

The step of impinging may include focusing the individual laser beams onto the reflectors.

The step of impinging includes providing a laser beam of a diameter greater than a diameter of the reflectors.

The step of impinging includes providing a laser beam of a diameter greater than a diameter of an arrangement of the reflector pairs.

The step of impinging includes emitting the laser light continuously when the reflectors enter the area of the laser light impinging on the workpiece.

The step of impinging includes emitting the laser light in a pulsed mode when the reflectors enter the area of the laser light impinging on the workpiece.

The step of arranging includes distributing a plurality of the reflector pairs (measuring units) about a circumference of the workpiece.

The step of arranging includes distributing three reflector pairs on the workpiece surface.

In the step of arranging the reflector pairs are arranged such that two measuring planes are provided at the workpiece, wherein each measuring plane includes at least two reflector pairs.

As a technical solution it is suggested with the invention to arrange on the surface of the shaft at least two reflector pairs which with respect to their connecting lines define an angle therebetween and which are irradiated with coherent laser light, whereby the reflected laser beam pairs, interfering with one another, of the reflective reflector pairs are measured with respect to their phase difference.

Thus, a contact-free measuring method of mechanical stresses of rotating shafts is provided with which the torsional stresses and/or axial stresses can be measured on rotating shafts in order to determine based thereon the corresponding torque moments and/or bending moments. The basic idea is that in two measuring planes positioned at an angle to one another respective laser beam pairs are brought into interference to one another in order to measure the phase differences. When the shaft is subjected to a torque moment and/or bending moment, torsion stresses and/or axial stresses result. In the elastic range such stresses cause at the surface proportional shearing and/or expansion.

Accordingly, the distances between the reflectors and thus the position of the interference lines will change. In the present load scenario a measurement of the displacement of the reflectors is sufficient in order to determine the torsion stresses and/or axial stresses and to calculate therefrom finally the torque moments and/or bending moments. In principal, it is possible to measure with the inventive measuring method simultaneously the torsional stresses as well as the axial stresses on the rotating shaft. It is also possible to measure only one of the two stress types with the inventive measuring method. In this context, the measuring of the torsional stress will be more advantageous because the torque moment can be measured without greater problems with acceptable precision since within the differential signal which is the basis for the torque determination, all like components will be cancelled. For the axial stress with the corresponding bending moment, in contrast thereto, a sum signal is formed resulting in the problem that angular errors, for example, due to shaft displacement or manufacturing imprecisions will fully affect the result. The advantage of the inventive measuring method is that the sensor operates without contact. Accordingly, no attachments to the shaft or special measuring shafts to be intermediately flanged are required. The sensor can thus be without retrofitted further expenditures. Furthermore, the torque moments and bending moments can be simultaneously detected, especially as a function of the rotational angle of the shaft. The sensor works furthermore completely passively and is thus completely insensitive with respect electromagnetic radiation. Moreover, the measuring sensor is of a small constructive size and can thus be mounted at locations that are difficult to access. Finally, from the occurrence of interference signals the rpm of the shaft can be measured and from it the output can be determined.

In a first alternative, four reflectors can be provided whereby two reflectors each form a reflector pair. This variant is easy to manufacture and is thus economical.

In a second alternative three reflectors are provided whereby one of the reflectors is common to both reflector pairs. This has the advantage of acompact design because the two reflector pairs can be arranged within a small area and local torsion stresses and/or axial stresses can be point-exactly determined due to the compressed arrangement of the reflectors.

Advantageously, the reflectors are impressions within the shaft or impressions on a carrier which is to be connected to the shaft. These impressions are, in general, stamped whereby the surfaces formed by the stamping are used to reflect the impinging laser light. This provides a technically simple possibility for providing reflectors since they can be realized with a correspondingly simple stamp so that a high position precision is possible. The impressions can be provided directly at the surface of the shaft. Instead, however, it is also possible to arrange the reflectors on a carrier which is then connected to the shaft. For example, the impressions can be pressed into a ring or a foil that is then to be connected to the shaft.

In a first alternative the impressions may be concavely curved impressions, for example, spherical impressions. The advantage of these impressions is that they can be easily provided at the shaft. However, the reflective intensity of the laser light is relatively minimal so that a high amplification is required which causes high costs.

The impression may be, in a second alternative, in the form of pyramid-shaped impressions with four facets. There regular four-sided pyramide provide a simple technical solution for reflecting the two laser beam pairs whereby respectively each facet is a reflector for a laser beam. In general, however, it is not necessary to provide pyramid shaped impressions with four facets but it is sufficient to provide oneet pair per laser beam pair.

In a preferred embodiment of the two reflector pairs the two connecting lines extend in an angle of +/–45° to the axis of the shaft. Thus, the two connecting lines of the two reflector pairs enclose an angle of 90° whereby upon application of the regular pyramid-shaped impressions their outer edges form a square and extend parallel to the connecting lines.

A further embodiment of the reflectors of the respective reflector pairs suggests that they are positioned at the same distance relative to one another. In conjunction with the 45° position of the connecting lines relative to the axis of the shaft this results in a symmetric arrangement in both measuring directions and measuring planes so that in a simple manner the corresponding torque moments and/or bending moments can be determined therefrom.

In a further embodiment it is suggested that the laser light is guided in the form of individual laser beams onto the reflectors, especially in a focused manner. The laser beams are especially focused on the facets of the reflectors insofar as they are the aforementioned regular pyramid-shaped impressions. The advantage of focusing the laser beams is that during the measuring process when the measuring beams impinge on the reflectors, there is only minimal incoherent reflection radiation so that the interference image is only slightly impaired.

In the alternative, the laser light impinges in the form of a laser beam with a diameter on the reflectors that is greater than the diameter of the individual reflectors or a group arrangement of the reflectors. In this context it is of no consequence whether the impression are pyramid-shaped impression or concavely curved impressions, especially spherical impressions. The basic idea of this alternative is that the reflectors are irradiated with a relatively wide laser beam. Only the portion of the laser beam which impinges on the reflectors will be reflected and brought into interference. However, it is disadvantageous that the reflected intensity is relatively small which requires a high amplification. However, this alternative also has advantageous. Displacements of the shaft, for example, upon thermal expansion in the axial direction, are tolerated, because the reflectors are still being illuminated by the laser light. In contrast, the permissible displacements for focusing of the laser beam are substantially smaller.

In another embodiment it is suggested that the laser light is supplied either continuously or pulsed when the reflectors reach the area of the impinging laser light. The pulsed variant has the advantage that a signal is generated in the interferometer only when a laser beam impinges in the are of the reflectors and has been reflected so that the noise level of the measuring signal is reduced to a minimum. For pulsing the laser beam it is possible to provide on the shaft respective markings which trigger the laser beam. The pulsed operation however is not necessarily needed for a noise-reduced operation of the measuring method. A continuous laser light irradiation also provides a noise level which is sufficiently small for achieving good measuring results.

A further embodiment of the Inventive method suggests that about the circumference of the shaft a plurality of measuring units is to be arranged. The arrangement of multiple measuring units about the circumference of the shaft has the advantage that an average moment distributed over the circumference can be determined or the moment can be determined as a function of the rotational angle.

Another embodiment of the Inventive measuring method suggests that three reflector pairs be used. The use of a third beam pair with a further interferometer has the advantage that the complete stress state at one location can be determined.

Finally, another embodiment of the inventive measuring method suggests that in both measuring planes, respectively, two or more reflector pairs are to be used. Thus, according to this embodiment, in each plane two beam pairs can be used. When using the regular pyramid-shaped impressions, it is advantageous to also use the respectively oppositely arranged facets for measuring because they are essentially still "free". This embodiment does require the use of further interferometers; however, the advantage lies in the compensation of certain angular errors.

BRIEF DESCRIPTION OF THE DRAWINGS

One embodiment of the inventive sensor for measuring torsion stresses and/or axial stresses at a rotating shaft for the subsequent determination of the corresponding torque moments and/or bending moments will be explained in the following with the aid of the drawings. It is shown in.

DESCRIPTION OF PREFERRED EMBODIMENTS

On a rotating shaft 1 three reflectors 2,3,4 are arranged. They are provided as impressions in the form of regular 4-sided pyramids within the surface of the shaft 1. The impressions serve for reflecting the impinging laser light that is thus brought to interference. The reflectors 2, 3, 4 define two reflector pairs 2, 3 and 2, 4, whereby the reflectors 2, 3, 4 of each reflector pair 2, 3 and 2, 4 have the same distance to one another and are positioned on connecting lines L1 and L2 which extend at an angle of +/−45° to the axis of the shaft. When a torque and bending moment is introduced into the shaft 1, the shaft 1 is subjected to torsional stresses and axial stresses. In the elastic range these stresses cause proportional sheering and expansion. Thus, the distances between the reflectors 2, 3, 4 and thus the position of the inference lines will change. In the presented load scenario a measurement of the displacement between the reflector pairs 2, 3 and 2, 4 is sufficient in order to determine the torsional stresses as well as axial stresses and thus to determine therefrom the torque moments and bending moments. Of course, it is also possible and conceivable to measure either the torsional stresses or the axial stress whereby the measurement of the torsional stress in comparison to the axial stress is simpler because in the differential signal to be formed all like parts are cancelled.

According to the superposition principal the superimposed loading corresponds to the sum of a pure torsion load and a pure bending load. For a pure torsion load the main expansion extends at an angle +/−45° to the shaft axis and in the +45° and the −45° direction results in the expansion based on bending because the torsional main expansions are cancelled. Conversely, from the difference results the torsion main expansion because the bending expansions are cancelled.

Figure 2:
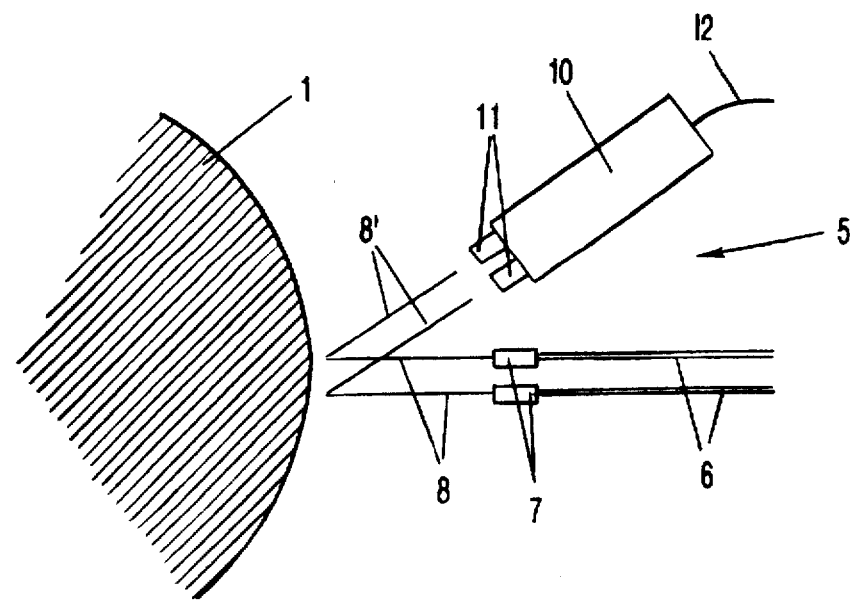
FIG. 2 a representation of the measuring arrangement perpendicular to the shaft axis.

For measuring the displacement a sensor arrangement 5 is positioned at a small distance from the surface of the shaft at the reflector pairs 2, 3 and 2, 4 which is represented in FIG. 2. Each of the two sensor arrangements 5 is comprised of two light wave guides 6 via which the coherent laser light is guided from a remote laser source. Each light wave guide 6 is terminated with a lens 7 in order to focus the impinging laser beams 8 onto the facets 9 of the reflectors 2, 3 and the facets 9' of the reflectors 2, 4. Furthermore, each sensor arrangement 5 includes an interferometer 10 to which the two reflected laser beams 8' are guided via lenses 11 and where they are brought into interference. At the terminals of the interferometer 10, intensity signals are provided which are supplied via light wave guides 12 to an electronic device for evaluation.

The outer edges of the reflectors 2, 3, 4 formed as impressions have a square shape and extend parallel to the connecting lines L1 and L2. The triangular shaped facets of the pyramids extend at an angle a relative to the surface of the shaft 1. When a perpendicular line is placed on the facets 9, 9' of the reflectors 2, 3, 4, then this straight line is positioned in planes which intersect at an angle of 90° with one another. FIG. 2 shows the plain extending across the reflectors 2, 3. The impinging and reflected laser beams 8, 8' form an angle a also with the straight lines. Thus between the two reflected laser beams 8' an optical path difference p results which is proportional to the distance I of the reflectors 2, 3 and proportional to the sine of the double angle a. With the mechanical loading of the shaft, the distance I between the reflectors 2, 3 changes and thus the optical path difference p between the reflected laser beams 8'. When the change of the optical path difference p relative to the wave length of the laser light and is multiplied by $2\pi$, a phase difference dp results which is proportional to the expansion between the reflectors 2, 3. The phase-displaced laser beams 8' generate within the interferometer 10 periodic intensity signals with a period length corresponding to wave length of the laser light from which, with the aid of electronic circuit arranged downstream the phase difference dp can be determined.

When the shaft 1 rotates, the four impinging laser beams 8 cover the surface area of the shaft 1 in the circumferential direction exactly at the position at which the facets 9, 9' are located. Since due to the focusing action the beam diameter is substantially smaller than the dimensions of the facet 9, 9', there is a time interval in which the laser beam 8 is reflected by the facets 9, 9'. Only during this time interval the reflected laser beams 8', due to the slant angle a of the facets 9, 9' and due to the position of the sensor arrangement 5, will impinge with a phase difference dp onto the lenses 11 of the interferometer 10. Outside of this time interval, only incoherent radiation will impinge on the interfere meter 10 so that no periodic intensity signal will be formed. The measuring time for determining the phase difference is thus exactly preset by the aforementioned time interval.

The special advantage of the inventive measuring method and the corresponding measuring device is first that no attachments are required on the shaft 1 or the use of intermediate flanges of special measuring shafts are required moments and bending moments can be determined simultaneously and also locally as a function of the rotational angle of the shaft 1. The sensor operates only passively and is thus completely insensitive with respect to electromagnetic radiation. Furthermore, the sensor is small and thus can be mounted even at locations that are difficult to access.

Figure 1:
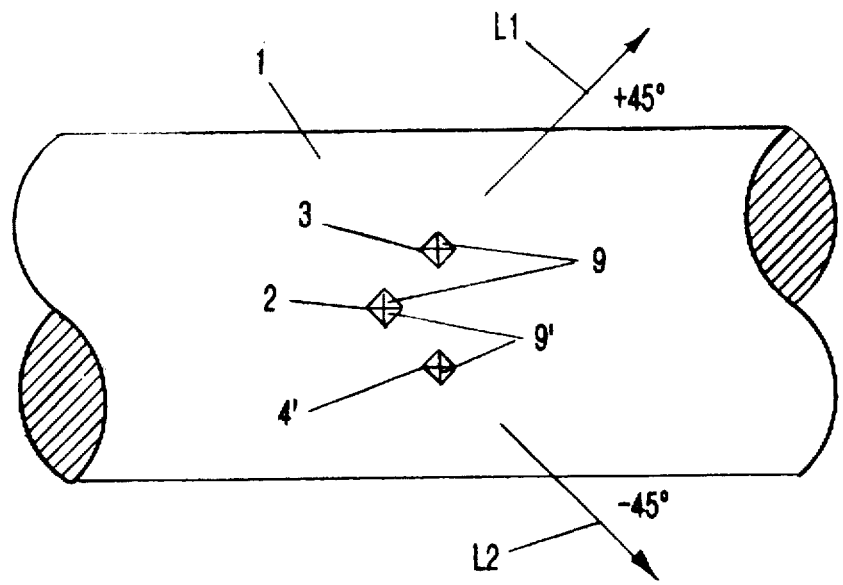
FIG. 1 a side view of the shaft with three reflectors arranged thereon in the form of pyramid-shaped impressions.
Figure 3:
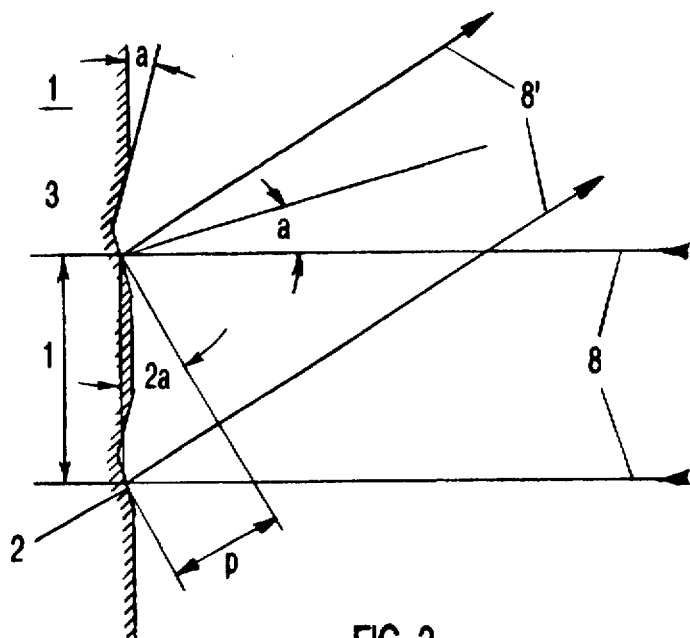
FIG. 3 the beam path of FIG. 2 but on an enlarged scale for clarification of details.
Figure 4:
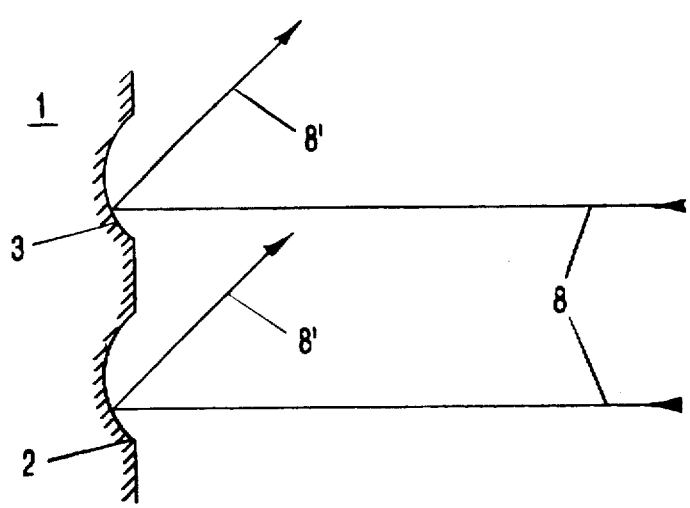
FIG. 4 a schematic representation corresponding to FIG. 3 but with spherical impressions as reflectors instead of the pyramid-shaped impressions.
Figure 5:
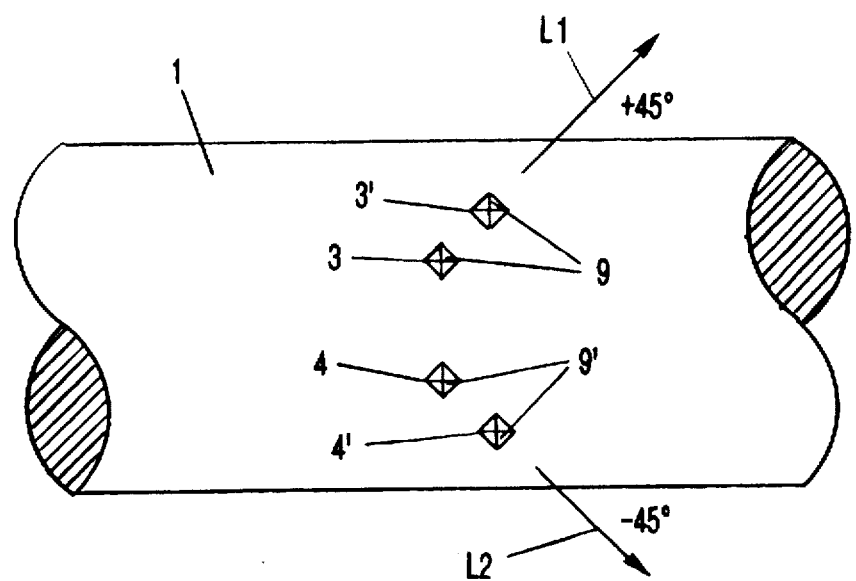
FIG. 5 a modified arrangement of the reflectors in a representation corresponding to FIG. 1.

In contrast to the embodiment represented in FIGS. 1 to 3, the inventive measuring device can be modified in various points as is represented in FIGS. 4 to 5. While in FIG. 3 the reflectors 2, 3 are shown as regular pyramid-shaped impressions, in the alternative embodiment in FIG. 4 the impressions are spherical impressions which reflect the impinging laser light correspondingly. Furthermore, it is shown in FIG. 5 that instead of three reflectors 2, 3, 4 four reflectors 3,3', 4,4' are provided and that two reflector pairs 3,3' and 4,4' are defined accordingly. The basic measuring principal, however, is identical to that of the reflector arrangement of FIG. 1.

Not represented in the drawings is the possibility to arrange the interferometer 10 not directly in the vicinity of the shaft 1. For example, it is possible to arrange the interferometer 10 at another location whereby the laser light is then guided via light wave guides to the interferometer 10. Furthermore, the arrangement with the reflectors, 2, 3, 4 or 3,3', 4,4' can be repeated over the circumference of the shaft 1, for example, in order to determine an average moment distributed over the circumference or in order to determine the moment as a function of the rotational angle. Furthermore, it is possible to determine the complete stress state of the shaft at one location when a third beam pair with a further interferometer is used. In the represented embodiment, pyramid-shaped impressions with four facets are used. Instead, it is possible to use for each beam pair only a single facet pair. Furthermore, the impressions can also be pressed into a ring or a foil which is then connected to the shaft 1. Also, in each plane (i.e., in the direction of the two connecting lines L1 and L2) two beam pairs can be used. In this context, the oppositely arranged facets of the already used facets 9, 9' are also used during measurement. However, this would, of course, require a further interferometer. An advantage of this embodiment would be the compensation of certain angular errors. Finally, it would not be necessary to focus the laser beams 8 on the reflectors. It is instead conceivable to provide the laser beam 8 with a diameter which is greater than the diameter of the individual reflectors or the diameter of a group arrangement of reflectors. Displacements of the shaft 1, for example, due to thermal expansion in the axial direction, can be compensated thereby because the reflectors are still illuminated. In the case of focusing the laser beams 8, permissible displacements of the shaft 1 are substantially smaller. The laser beams 8 can be pulsed or can be emitted continuously.

The present invention is, of course, in no way restricted to the specific disclosure of the specification and drawings, but also encompasses any modifications within the scope of the appended claims.

What I claim is:

1. A method for measuring torsional stress and axial stress of a rotating workpiece, said method comprising the steps of:

arranging at a surface of the workpiece at least two reflector pairs such that connecting lines between reflectors of each reflector pair are slanted relative to one another;

rotating the workpiece about an axis of rotation;

determining a phase difference between the light beams of each light beam pair; and calculating the torsional stress and axial stress from the phase difference.

2. A method according to claim 1, wherein in the step of arranging four reflectors are provided such that two reflectors define one of the reflector pairs and the other two reflectors define the other reflector pair.

3. A method according to claim 1, wherein in the step of arranging three reflectors are provided for defining two reflector pairs such that one of the three reflectors is common to both reflector pairs.

4. A method according to claim 1, wherein the step of arranging includes providing the reflectors in the form of impressions in the workpiece.

5. A method according to claim 4, wherein the step of arranging includes forming concave impressions.

6. A method according to claim 4, wherein the step of arranging includes forming equal-sided pyramid-shaped impressions with four facets.

7. A method according to claim 1, wherein the step of arranging includes connecting a carrier to the workpiece and providing the reflectors in the form of impressions in the carrier.

8. A method according to claim 7, wherein the step of arranging includes forming concave impressions.

9. A method according to claim 7, wherein the step of arranging includes forming equal-sided pyramid-shaped impressions with four facets.

10. A method according to claim 1, wherein a first one of the connecting lines extends at an angle of +45° to the axis of rotation and a second one of the connecting lines extends at an angle of −45° to the axis of rotation.

11. A method according to claim 1, wherein the step of arranging includes spacing the reflectors of each one of the reflector pairs at identical distance to one another.

12. A method according to claim 1, wherein the step of impinging includes supplying the coherent laser light in the form of individual laser beams.

13. A method according to claim 12, wherein the step of impinging includes focusing the individual laser beams onto the reflectors.

14. A method according to claim 1, wherein the step of impinging includes providing a laser beam of a diameter greater than a diameter of the reflectors.

15. A method according to claim 1, wherein the step of impinging includes providing a laser beam of a diameter greater than a diameter of an arrangement of the reflector pairs.

16. A method according to claim 1, wherein the step of impinging includes emitting the laser light continuously when the reflectors enter the area of the laser light impinging on the workpiece.

17. A method according to claim 1, wherein the step of impinging includes emitting the laser light in a pulsed mode when the reflectors enter the area of the laser light impinging on the workpiece.

18. A method according to claim 1, wherein the step of arranging includes distributing a plurality of the reflector pairs about a circumference of the workpiece.

19. A method according to claim 1, wherein the step of arranging includes distributing three reflector pairs on the workpiece surface.

20. A method according to claim 1, wherein in the step of arranging the reflector pairs are arranged such that two measuring planes are provided at the workpiece and wherein each measuring plane includes at least two reflector pairs.